(12) United States Patent
Maleki et al.

(10) Patent No.: US 9,787,106 B2
(45) Date of Patent: Oct. 10, 2017

(54) METHOD AND APPARATUS FOR IMPROVING CYCLE LIFE CAPACITY OF A BATTERY PACK

(71) Applicant: Google Technology Holdings LLC, Mountain View, CA (US)

(72) Inventors: Hossein Maleki, Lawrenceville, GA (US); Jerald A. Hallmark, Sugar Hill, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 599 days.

(21) Appl. No.: 13/621,907

(22) Filed: Sep. 18, 2012

(65) Prior Publication Data

US 2014/0077769 A1  Mar. 20, 2014

(51) Int. Cl.
*H02J 7/00* (2006.01)

(52) U.S. Cl.
CPC .............. *H02J 7/00* (2013.01); *H02J 7/008* (2013.01); *H02J 7/0014* (2013.01); *H02J 7/0078* (2013.01); *H02J 7/0021* (2013.01)

(58) Field of Classification Search
CPC .......... H02J 7/007; H02J 7/008; H02J 7/0086; H02J 7/0073; H02J 7/0075; H02J 7/0077; B60L 11/1851; H01M 10/44; H01M 10/448; H01M 10/48
See application file for complete search history.

(56) References Cited

U.S. PATENT DOCUMENTS

| | | | |
|---|---|---|---|
| 5,488,283 A * | 1/1996 | Dougherty et al. ......... | 307/10.1 |
| 5,744,258 A | 4/1998 | Bai et al. | |
| 6,023,150 A * | 2/2000 | Patino ................... | H02J 7/0004 320/132 |
| 6,259,227 B1 * | 7/2001 | Gherman ......... | G01R 19/16542 320/101 |
| 6,337,560 B1 | 1/2002 | Kalogeropoulos et al. | |
| 6,342,774 B1 | 1/2002 | Kreisinger et al. | |

(Continued)

FOREIGN PATENT DOCUMENTS

| | | |
|---|---|---|
| EP | 1460743 A1 | 9/2004 |
| JP | 2001258167 A | 9/2001 |
| KR | 1020040071248 | 8/2004 |

OTHER PUBLICATIONS

Patent Cooperation Treaty, International Search Report and Written Opinion of the International Searching Authority for International Application No. PCT/US2013/054620, dated May 20, 2014, 11 pages.

*Primary Examiner* — Vuthe Siek
*Assistant Examiner* — Aric Lin
(74) *Attorney, Agent, or Firm* — McDonnell Boehnen Hulbert & Berghoff LLP

(57) ABSTRACT

A method (900) of reducing variation of an energy storage capacity of a battery across its cycle life is disclosed. The method can include the step (901) of monitoring one or more voltages of one or more cells of a battery for a predetermined discharge usage time. Where a profile of the one or more voltages during the predetermined discharge usage time meets a predefined usage criterion, the method can include the step (907) of increasing a discharge voltage limit of the one or more cells. An energy management circuit (614) can be configured with a control circuit (702) operable to increase the discharge limit and to limit discharge of the cells when the discharge limit is reached.

20 Claims, 10 Drawing Sheets

(56) References Cited

U.S. PATENT DOCUMENTS

| | | |
|---|---|---|
| 6,771,051 B2 | 8/2004 | Ogelsbee et al. |
| 6,859,014 B2 | 2/2005 | Bohne et al. |
| 6,914,415 B2 | 7/2005 | Bohne et al. |
| 7,202,635 B2 | 4/2007 | Patino et al. |
| 7,489,106 B1 * | 2/2009 | Tikhonov .............. H02J 7/0018 320/116 |
| 7,642,753 B2 | 1/2010 | Simpson et al. |
| 2003/0113613 A1 | 6/2003 | Takeuchi et al. |
| 2004/0222768 A1 | 11/2004 | Moore et al. |
| 2005/0104558 A1 | 5/2005 | Murakami et al. |
| 2007/0166617 A1 | 7/2007 | Gozdz et al. |
| 2008/0261116 A1 * | 10/2008 | Burton et al. ............. 429/231.8 |
| 2009/0107743 A1 * | 4/2009 | Alston ............... B60H 1/00428 180/65.21 |
| 2010/0070220 A1 * | 3/2010 | Darilek ................ G01R 31/361 702/63 |
| 2010/0121587 A1 * | 5/2010 | Vian ................. G01R 31/3651 702/63 |
| 2010/0285363 A1 | 11/2010 | Christensen et al. |
| 2011/0006736 A1 | 1/2011 | Robinson et al. |
| 2012/0056590 A1 * | 3/2012 | Amiruddin ........... H01M 4/505 320/130 |
| 2012/0176097 A1 * | 7/2012 | Takezawa et al. ............ 320/134 |
| 2013/0099724 A1 * | 4/2013 | Rich ........................ H02J 7/00 320/106 |
| 2013/0257382 A1 * | 10/2013 | Field et al. ................... 320/134 |
| 2014/0011057 A1 * | 1/2014 | Schaefer ........... H01M 10/4207 429/50 |
| 2014/0217984 A1 * | 8/2014 | Banerjee ............... H01M 10/48 320/128 |

* cited by examiner

METHOD AND APPARATUS FOR IMPROVING CYCLE LIFE CAPACITY OF A BATTERY PACK

BACKGROUND

Technical Field

This invention relates generally to energy management, and more particularly to methods and systems of charging to improve battery cycle life.

Background Art

Portable electronic devices, such as cellular telephones, laptop computers, tablet computers, pagers, and two-way radios for example, derive their portability from batteries having rechargeable cells. These batteries allow these devices to slip the surly bonds of power supplies tethered to walls and to travel wirelessly with users wherever they may go. A typical battery disposed within one of these devices may be charged and discharged hundreds of times over its lifetime. This is particularly true due to the daily reliance people increasingly place upon their personal devices.

When a rechargeable battery is new, the cells within that battery can typically be charged to their maximum rated capacity. Said differently, one hundred percent of the cell capacity is available to store and deliver energy when the battery is new. As the battery is charged and discharged over the course of its life, however, its energy storage capacity, which measures the battery's capability to power a device, decreases due to chemical changes within the cells. For example, after roughly 400 charge/discharge cycles, the cells within a battery may only be chargeable to eighty-five or less percent of their original maximum capacity. As a result, a user may notice that the portable electronic device that receives its power from the battery does not provide as much run time for active operations or idle time for standby operations between charging cycles as the device initially did.

It would be advantageous to be able to reduce changes in capacity over time.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 11 illustrates cumulative discharge capacity for cells used in accordance with one or more embodiments of the present invention compared to prior art cells.

FIG. 12 shows charge capacity plotted against cumulative charge capacity with a first curve 1201 representing the full discharge test, a second curve 1202 representing the upper-voltage range test, and a third curve 1203 representing the lower-voltage range test.

Figure 1:
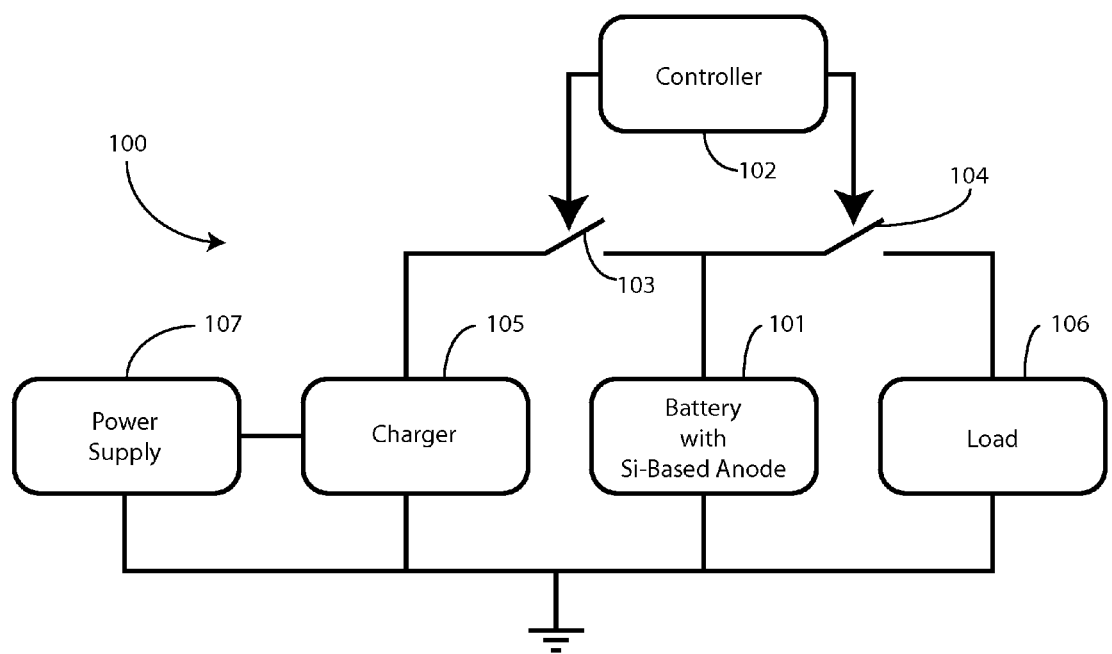
FIG. 1 illustrates a testing environment for measuring cell capacity in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to reducing variation in charge capacity across the cycle life of one or more cells in a battery pack in accordance with one or more embodiments of the invention. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of altering a discharge termination point for one or more cells to extend their capacity across cycle life as described herein. The non-processor circuits may include, but are not limited to, a radio receiver, a radio transmitter, signal drivers, clock circuits, power source circuits, and user input devices. As such, these functions may be interpreted as steps of a method to perform charge capacity variation reduction across cycle life. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

The demand for energy from a battery pack is constantly increasing due to the advent of new portable devices, e.g., smart phones, tablet computers, and laptop computers. The increased demand for energy is due, in part, to the new feature sets included in these devices. For example, while mobile phones used to be used only for making telephone calls, today users employ smart phones to make telephone calls, surf the web, watch videos, play games, and take pictures. Additionally, many smart phones today run software operating systems that are similar to those used by personal computers. Many of these devices include touch sensitive screens and wireless connectivity, each of which presents an increased demand for energy.

While conventional lithium-ion based or other types of charged-ion based battery technologies, are capable of powering these devices to some extent, they have limitations. Illustrating by example, when using a lithium-ion battery in a tablet employing local-area wireless communication capability, wide-are network communication capability, power hungry video processors, and a touch sensitive display, the battery must be capable of handling a wide range of current loads that vary from high discharge rates to very low discharge rates. To make a conventional lithium-ion battery capable of handling the high discharge currents required by such a device, a designer must sacrifice some of the energy storage capacity found in a common lithium-ion battery for a conventional phone. Moreover, trying to use lithium-ion or lithium-ion polymer batteries beyond their rated current handling capabilities causes extensive cycle life degradation and can even compromise the reliability of the battery itself.

Standard single-cell lithium-ion batteries typically operate between a rated charge voltage of 4.2 volts and a rated discharge voltage of 3.0 volts. This means that charging current is limited or stopped when the cell voltage rises to 4.2 volts, and correspondingly that discharging current is limited or stopped when the cell voltage falls to 3.0 volts. Further, such cells are typically rated to charge or discharge at a "1-C" rate. This means that charging or discharging current is frequently limited to a predetermined level. In a 400 mA–h cell, a "1-C" rate means that charging or discharging current is typically limited to 400 mA.

It is known that in rechargeable batteries, such as lithium-ion or lithium-ion polymer batteries, the number of charging and discharging cycles that a cell experiences has a dramatic impact on the life of the overall battery. In general, as the charge voltage increases, the initial capacity of the battery also increases. However, increasing the charge voltage will decrease the battery cycle life. As an example, if a standard lithium-ion battery that has a rated charge voltage of 4.2V is charged to 4.3V, the added termination voltage increases the capacity of the battery between five and fifteen percent. The effect of overcharging the battery to achieve this increased capacity, however, is that the cycle life of the battery is decreased thirty to fifty percent. Additionally, overcharging risks compromising cell thermal stability and overall battery reliability. Consequently, manufacturers attempt to set the internal charge level of rechargeable batteries to a level that creates a capacity that is effective for the application, but does not significantly adversely impact the battery cycle life or reliability.

In "high performance" applications, a manufacturer will expand the charging range by increasing the rated charge voltage. To keep from adversely impacting cycle life, those same manufacturers will decrease the rated charging or discharging current. For example, in high performance lithium-ion cells of different chemistries, the rated charging voltage may be 4.35 volts. However, the rated charging or discharging current may only be 0.5-C to 0.7-C. If this decreased current rating is exceeded during charging, abnormalities, e.g., lithium plating, or non-uniform current handling distribution begins to occur on the anode of the cell. The plating in particular results in a reduction of cell energy density and thermal stability degradation. If the decreased current rating is exceeded during discharge, internal heating can result. This internal heating also results in decreased battery cycle life.

To overcome these issues, new cell technology is being developed in which silicon or silicon-carbon based anode materials are used in the cell. The addition of silicon allows the operating voltage range of the cell to be increased. For example, rather than having a rated discharge voltage of 3.0 volts, lithium cells having silicon-based anodes have a rated discharge voltage of between 2.5 and 2.7 volts.

The inventors of the present application have discovered through experimental testing that the cycle life of cells employing silicon-based anodes degrades much more rapidly when operating across its manufacturer prescribed full voltage range (typically 4.35-2.7V) than when operating only in its upper voltage range. Accordingly, capacity in a cell that is discharged from 4.0 volts to 2.7 volts will degrade much more rapidly than when that same cell is discharged from 4.35 volts to 3.6 volts.

This enhanced "upper range" cycle life performance occurring in cells having silicon-based anodes is exactly opposite that occurring in cells having conventional graphitic base carbon, e.g., graphite, anodes without silicon. In traditional cells, cycle life is preserved when the cell is operated in the lower end of its operational voltage range. Thus, for a conventional cell rated between 3.0 and 4.35 volts, discharging from 4.0 to 3.0 volts will preserve more cell capacity across a predetermined number of cycles than will discharging a cell from 4.35 to 3.5 volts. Consequently, a user who "tops off" their partially discharged cell nightly (or also during the day for heavy users) will experience more capacity loss over time than a user who completely discharges the cells in their battery prior to recharging.

Given that the inventors have discovered that cells having silicon-based anodes operate directly opposite traditional cells with reference to capacity loss across cycle life, embodiments of the present invention work to optimize cycle-life across a wide voltage range in lithium-ion based batteries employing silicon-based anodes without compromising the thermal stability of those cells. Embodiments of the present invention are particularly important for electronic devices employing embedded batteries that are not replaceable by the end user, as the cell can experience a thirty to forty percent greater cycle life when using embodiments of the present invention.

In one embodiment of the invention, a method of reducing variation of an energy storage capacity of a battery across its cycle life includes monitoring, with a voltage sensor, one or more voltages of one or more cells of the battery for a predetermined discharge usage time. Examples of predetermined discharge usage times may be three days, five days, seven days, or alternatively may be measured in charging and discharging cycles, such as three cycles, five cycles, ten cycles, and so forth. Where a profile of the one or more voltages during the predetermined discharge usage time meets a predefined usage criterion, embodiments of the invention increase a discharge voltage limit of the one or more cells. For example, in one embodiment the discharge voltage limit may be increased from 2.7 volts to 3.1 volts. While this results in a slightly reduced single-use capacity, experimental testing has shown that the reduced capacity is on the order of five to seven percent. Meanwhile, by increasing the discharge voltage limit, the overall capacity of the cell can be increased by over fifteen percent after 400 cycles, which provides the user with a greater total amount of discharge time, which represents increased run or usage time, across the life of the battery. Many users will find this quite advantageous, especially when the battery is embedded in the device and is not easily changed. Embedded batteries typically can only be replaced by manufacturer approved technicians to prevent damaging the device or battery components.

In prior art designs, due to the manufacturer constraints on the preset charging and discharging termination voltages, the consumer does not have any ability to change or otherwise control the capacity of the battery based upon usage. The charge termination and discharge termination voltage limits are all controlled by the circuitry of the battery. Additionally, even if the consumer could change the charge termination or discharge termination voltages, in prior art designs the consumer does not have the information regarding the true effective safe level of charging voltages and capacities of the battery in relation to the deleterious effects of the increased charging voltage on the battery life.

Embodiments of the present invention overcome these shortcomings. In accordance with one embodiment, the discharge termination voltage can be adjusted to accommodate a user's discharge profile. This adjustment can be made automatically in one embodiment. In another embodiment, the user can be prompted to ensure that they are willing to exchange a small decrease in capacity for a single cycle in order to increase the overall cycle life of the battery itself. Moreover, in one or more embodiments where the user is prompted prior to adjustment, control devices described herein can provide the user with an estimated daily capacity lost versus life-time capacity gained.

In one or more embodiments of the invention, methods and devices are provided to improve the cycle-life of lithium-ion or any other charged ion based batteries employing silicon in their anodes by altering the discharge voltage limits of those cells. Silicon-based anodes include anodes comprising silicon, silicon and carbon, silicon and selenium, or silicon, selenium, and carbon and pre lithiated silicon-carbon. The anodes may also include a silicon alloying materials. Suitable carbon based materials used in the electrodes may include both graphitic carbon, e.g., natural and synthetic, miso-phase-microfibers, micro-fibers and core shell coated, and non-graphitic carbon, e.g., soft carbon, hard carbon and combination of both soft and hard carbon.

The predefined usage criterion can take various forms. For example, in one embodiment, the predefined usage criterion comprises the voltages of the cells remaining above a rated discharge voltage by at least a predetermined margin. For example, if the rated charging voltage is 4.35 volts, and the rated discharge voltage is 2.7 volts, a user who only partially discharges the battery will not drive the battery to its rated discharge voltage limit. If, for instance, the user discharges the battery 35% during the day, and then recharges the battery overnight, the minimum voltage may be only 4.0 volts. To accommodate such a user, the predefined usage criterion may be detecting that the cells of the battery remain above 2.7 volts by a predetermined margin, such as 0.75 volts, for at least a predetermined number of charging cycles or days. Another example of a predefined margin would be about 25% above the rated discharge voltage. Still others will be obvious to those of ordinary skill in the art having the benefit of this disclosure.

In another example, the predefined usage criterion can comprise determining a percentage discharge over a predefined period of time. For example, in one embodiment, a control circuit can monitor voltage of the cells of a battery for a predetermined period, such as five days. If the discharge cycles during that time fail to discharge the cells more than 75% of their rated capacity or their actual capacity that has been determined by monitoring, embodiments of the invention might automatically increase the discharge voltage limit or, alternatively, prompt the user requesting whether such an increase is permissible. After this change is made, when this predetermined criterion is reached, methods and apparatuses described herein can increase the discharge voltage limit by a predetermined amount, such as 400 mV. The user would not notice a significant difference in capacity, yet would enjoy a better cycle life.

In another example, a user may actually reach the rated discharge voltage before recharging. Where a user fully discharges their battery on a daily basis, there may still be a desire for extended cycle life capacity. Where the battery is embedded into an electronic device and is not easily changed by a user, the user may want to extend the capacity of that battery as much as possible to prolong the life of the overall device. Since the user will be recharging anyway, they may desire to live with a slightly increased discharge voltage limit to achieve an extended cycle life capacity. To accommodate such a user, one method described below can include delivery of a prompt to a user interface of an electronic device operable with the battery requesting user permission to increase the discharge voltage limit. This prompt may include a capacity-run time tradeoff indication, for the user may be more willing to make the compromise if only 5-7% of daily capacity will be lost. Once a response is received from the user interface, a control circuit can then increase the discharge voltage limit. When this increased discharge voltage limit is reached, the control circuit can provide a low battery indication when the one or more voltages fall to the discharge voltage limit.

Turning now to FIG. 1, illustrated therein is a testing system 100 with which lithium-based cells having silicon-based anodes were tested to determine the effects of partial charging and/or partial discharging as it relates to cycle-life performance. The cells 101 tested were lithium-ion polymer cells having anodes comprising carbon and silicon. The cells 101 had a capacity of 1070 mAh. The anodes of these cells (101) were about 4-8% silicon and about 92% graphite. However, embodiments of the invention contemplate application to cells having anodes with far more silicon as well, as silicon has roughly ten times the energy storage capacity of graphite. Accordingly, as the technology improves, the percent silicon present in an anode will increase.

As shown in the figure, the testing system 100 includes a controller 102 in communication with one or more switches 103,104. The controller 102 is programmed with the test algorithm, and selectively opens and closes the switches 103,104 to selectively couple a battery charger 105 or a load 106 to the cells 101. The battery charger 105, which contains charging circuitry, is electrically connected to a power supply 107.

In a first test, the cells 101 were cycled 500 times. Each "cycling" of the cells 101 included charging them to 4.35 volts with a 1.07 A (1C) current, and with charge step terminated when current dropped below 20 mA. The cells 101 were then discharged to 2.7 volts with a discharge current of 1.07 A. The cells 101 were rested for ten minutes. The process was then repeated. This first test was full charge/discharge cycling test.

In a second test, the cells 101 were partially discharged using a piecewise linear discharge format. The cells 101 were initially charged to 4.35V at 1.07 A with charge step terminated when current dropped below 20 mA. They were then discharged to 4.0 volts using a discharge current of 1.07 A. The cells 101 were then allowed to rest for five minutes. The process repeated, but the second discharge level was to 3.8 volts. The third discharge level was to 3.6 volts. This three-step of fully charged cells and discharge process, with a first discharge to 4.0 volts, a second to 3.8 volts, and a third to 3.6 volts, was repeated 30 times. Then the 30 cycles of charge to 4.35V and the step-wise discharge from 4.35 to 4.0V, 4.35 to 3.8V and 4.35 to 3.6V were repeated 40 or more times. This test was the upper-voltage range cycling test.

In a third test, the cells 101 were again partially discharged using a piecewise linear discharge format. However, they were not charged to their rated full charging voltage. Instead, the cells 101 were initially charged to 4.0V using 1.07 A with charge step terminated when current that dropped below 20 mA. They were then discharged to 2.7 volts using a discharge current of 1.07 A. The cells 101 were then allowed to rest for five minutes. The process repeated, but the second charge level was only to 3.8 volts. The cells 101 were again discharged to 2.7 volts. The third charge level was only to 3.6 volts. This three-step discharge to 2.7 volts process, with a first charge to 4.0 volts, a second to 3.8 volts, and a third to 3.6 volts, was repeated 30 times. This test was the lower-voltage range cycling test.

Figure 2:
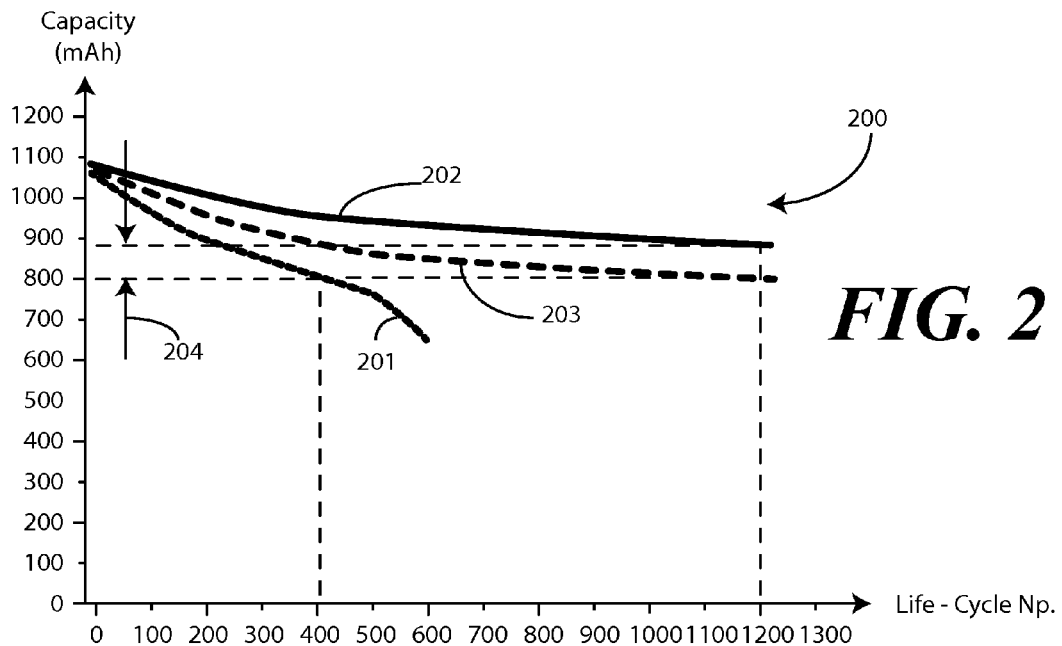
FIG. 2 illustrates cell capacity reduction with increasing charge/discharge cycles when cells are used in accordance with one or more embodiments of the present invention compared to prior art cell capacity reduction.

The results of these tests were informative. Turning now to FIG. 2, illustrated therein are the results from the three tests. Specifically, graph 200 illustrates a curve 201 representing the full discharge test, a second curve 202 representing the upper-voltage range test, and a third curve 203 representing the lower-voltage range test. A point to note in reading graph 200 is that curves 202,203 are flatter (about three times more cycles to reach 800 mAh) than curve 201 because each "cycle" represented in curve 201 is a full discharge cycle. By contrast, each "cycle" represented in curves 202,203 is a partial discharge cycle that discharged only a third of the capacity of the cells (101). Consequently, 1200 cycles for either curve 202 or curve 203 is the equivalent of only 400 cycles for curve 201.

With this convention in mind, three things become clear from the experimental testing: First, there is clearly capacity fade in lithium cells having silicon-based anodes over their cycle life. Examining curve 201, it is clear that while the cells (101) started with a capacity of nearly 1100 mAh, after 400 cycles that capacity was only 800 mAh. This represents over a 25% loss in capacity across a 400-cycle life.

Second, when the cells (101) were exposed to the lower-voltage range test, they experienced almost the identical amount of capacity loss. Specifically, after 1200 cycles, which is the equivalent of 400 full discharge cycles, the cells exposed to the lower-voltage range test lost 25% of their capacity as well.

However, when the cells (101) were exposed to the upper-voltage range test, they experienced an improvement 204 of nearly 100 mAh in capacity retention across the same range. This represents a 50% improvement over the cells (101) that were fully discharged or were cycled in the lower end of their rated voltage range.

Figure 3:
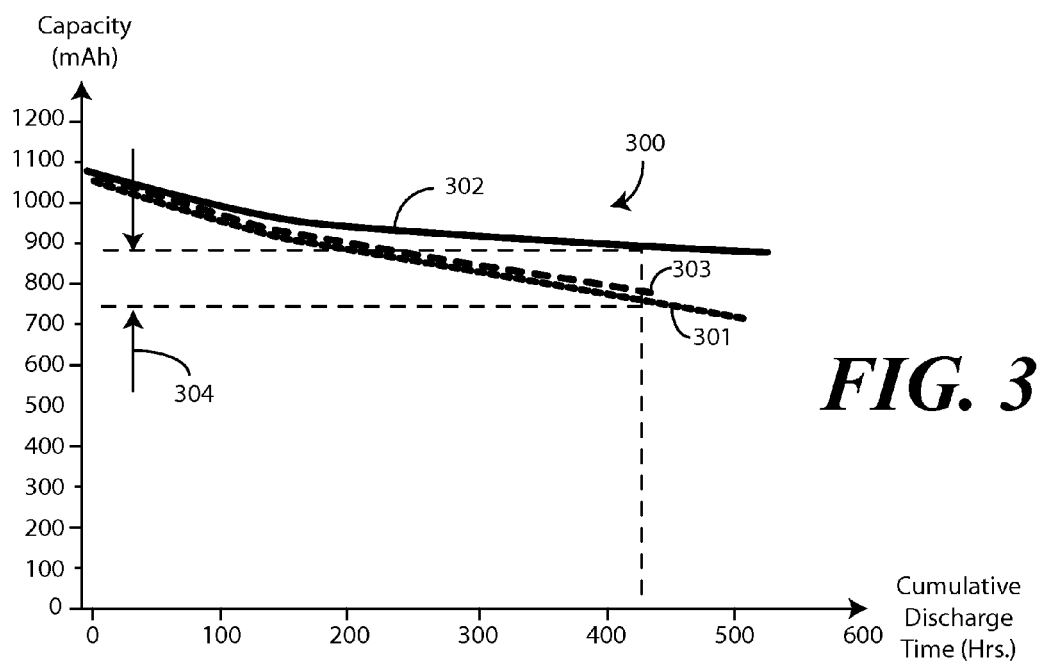
FIG. 3 illustrates cell capacity reduction with cumulative discharge time for cells used in accordance with one or more embodiments of the present invention compared to prior art cells.

It should be noted that these results, i.e., that operating lithium-ion based cells having silicon-based anodes in the upper portion of their rated voltage range, are unexpected in that they are exactly opposite that for purely graphite based anodes. It has long been understood that operating cells having graphite anodes in their lower voltage range is advantageous. See, e.g., commonly assigned, U.S. Pat. No. 7,202,635 to Patino et al., filed Mar. 10, 2004, which is incorporated herein by reference. Accordingly, the testing performed in accordance with FIGS. 1-3 presents a new and unexpected result that is contrary to prior results. Embodiments of the invention use these unexpected results derived from experimental testing to provide a method and apparatus that, when appropriate, will increase a lower voltage discharge limit to keep the cells (101) operating in their upper voltage range. This, in turn, can provide up to a 50% reduction in lost cell capacity over time.

Turning now to FIG. 3, the same results can be seen in a slightly different chart 300. Rather than being plotted against cycles, which presented the "3 partial discharges equate to one full discharge" construct, capacity is plotted against cumulative discharge time to provide an apples-to-apples comparison between the three tests performed with the testing system (100) of FIG. 1.

Chart 300 illustrates a first curve 301 representing the full discharge test, a second curve 302 representing the upper-voltage range test, and a third curve 303 representing the lower-voltage range test. As with the graph (200) of FIG. 2, three things become clear from the experimental testing: First, there is clearly capacity fade in the test cells having silicon-based anodes over their operable life, which is represented here as cumulative discharge time. Examining curve 301, it is clear that while the cells (101) started with a capacity of nearly 1100 mAh, after 400 hours of cumulative discharge at roughly 1.07 A capacity was only 800 mAh.

This represents over a 25% loss in capacity across a 400-hours of cumulative discharge life.

Second, when the cells (101) were exposed to the lower-voltage range test, they experienced almost the identical amount of capacity loss. Specifically, after 400 hours of cumulative discharge, the cells exposed to the lower-voltage range test lost 25% of their capacity as well.

However, when the cells (101) were exposed to the upper-voltage range test, they experienced an improvement 304 of nearly 100 mAh in capacity retention across the same range. This represents a 50% improvement over the cells (101) that were fully discharged or were cycled in the lower end of their rated voltage range.

Figure 4:
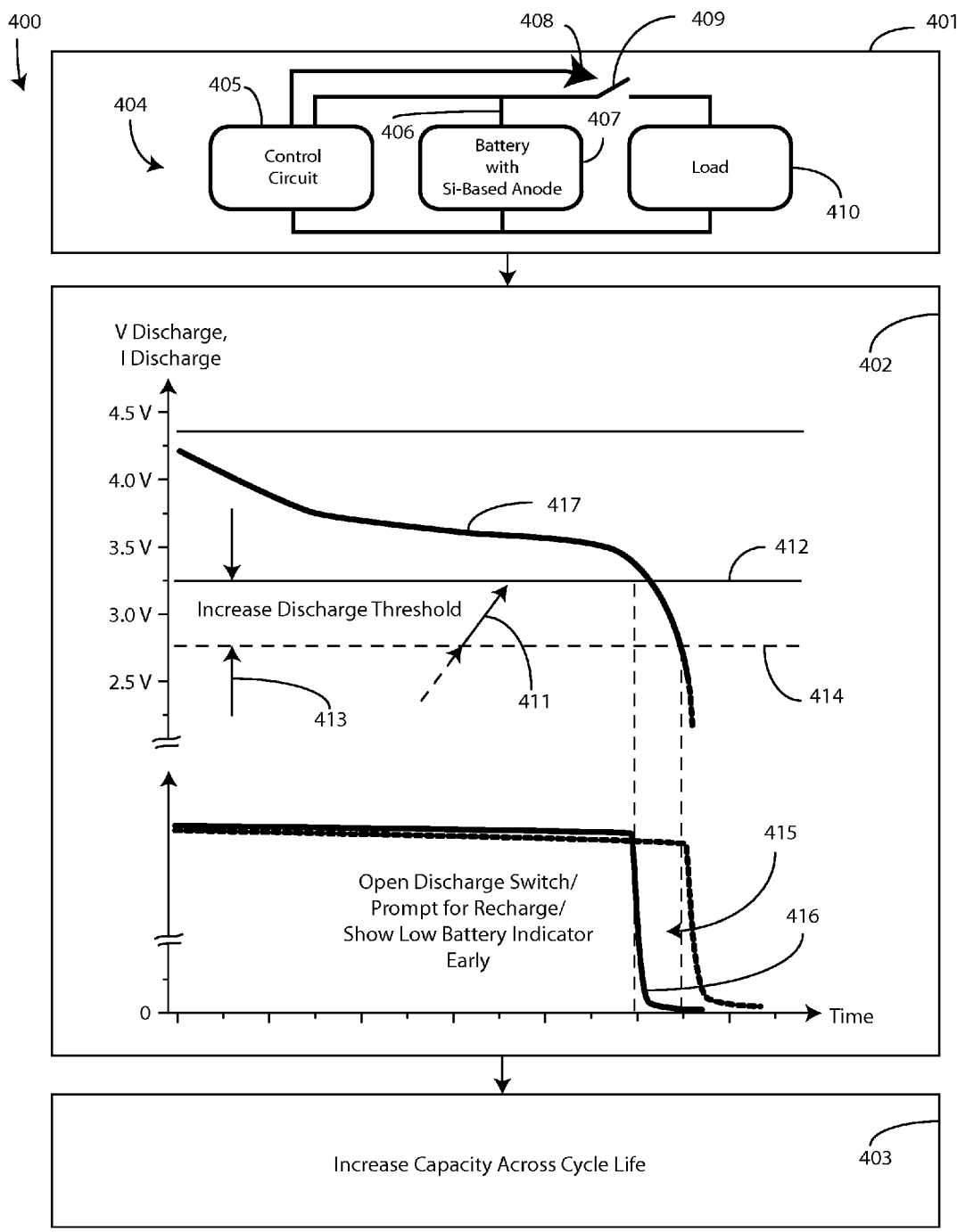
FIG. 4 illustrates one explanatory method of energy management for batteries configured in accordance with one or more embodiments of the invention.

Turning now to FIG. 4, illustrated therein is an operative block diagram 400 showing one embodiment of a method configured in accordance with one or more embodiments of the invention. At step 401, the schematic block diagram of a system 404 configured in accordance with one or more embodiments of the invention is provided. The system 404 comprises a control circuit 405 that is operable with a voltage sense node 406. The voltage sense node 406 is configured to permit the control circuit 405 to sense a voltage across one or more rechargeable cells 407. In one embodiment, the one or more rechargeable cells 407 are lithium-based, e.g., lithium-ion or lithium-ion polymer, and have anodes that comprise silicon. As noted above, such an anode can be roughly 90% graphite and 5-7% silicon. Greater amounts of silicon and other type of carbon materials with suitable concentration silicon to carbon ratios can be used as well.

The control circuit 405 is also operable with a discharge control node 408. The discharge control node 408 is configured to control a discharge current limiter 409 that is coupled serially between the one or more rechargeable cells 407 and a load 410, which may be a mobile telephone, smart phone, tablet computer, palm top computer, laptop computer, gaming device, multimedia player, or other electronic device. The discharge control node 408 is configured to give the control circuit 405 control of the discharge current limiter 409, which may be a transistor, such as a bipolar junction transistor or metal oxide silicon field effect transistor. Using the discharge control node 408, the control circuit 305 can effectively "open" or "close" the discharge current limiter 409 by applying a voltage to the discharge control node 408 to change a serial impedance of the discharge current limiter 409.

Note that in one embodiment the control circuit 405, one or more cells 407, and load 410 can be integrated into a single device. For example, where the load 410 is a tablet computer with the one or more cells 407 embedded therein, the control circuit 405 can be integrated with a main processing circuit of the tablet computer, or may be an application specific control circuit within the device.

Alternatively, the control circuit 405 and one or more cells 407 can be integrated into a "smart battery" that is coupled to the load 410. For example, where the load 410 is a laptop computer, the smart battery may be selectively detachable from the computer. By disposing the control circuit 405 in the battery itself, prior art electronic devices can be retrofitted with embodiments of the invention.

The control circuit 405 first monitors, with the voltage sense node 406, the voltage of the one or more cells 407 for a predetermined discharge usage time. The predetermined usage time can be a period of days, a period of charge and/or discharge cycles, or other usage times. Illustrating by example, a predetermined usage time can be five days. Alternatively, the predetermined usage time may be seven charging cycles. Other usage times will be obvious to those of ordinary skill in the art having the benefit of this disclosure.

As shown at step 402, where a profile of the monitored voltages during the predetermined discharge usage time meets a predefined usage criterion, the control circuit 405 can be configured to increase 411 a discharge voltage limit 412 of the one or more cells 407. In one embodiment, the control circuit 405 increases 411 the discharge voltage limit 412 a predetermined amount 413 from the rated discharge voltage 414 for the one or more cells 407. Thus, if the rated discharge voltage 414 was 2.7 volts, the control circuit 405 may increase 411 the discharge voltage limit 412 a predetermined amount 413, such as 400 mV, above 2.7 volts.

In other embodiments, the method can be iterative. Thus, when executing step 402 the first time, the discharge voltage limit 412 may be increase a predetermined amount 413, such as 0.25 volts. After subsequent monitoring, step 402 may be re-executed, resulting in the discharge voltage limit 412 being raised from its previously raised level by another predetermined amount 413, such as 0.25 volts, which results in a 0.5 volt increase over the rated discharge voltage 414.

As shown at step 403, during usage, when the discharge voltage limit 412 is reached, the control circuit 405 can use the discharge control node 408 to increase the impedance of the discharge current limiter 409. This limits 415 the discharge current 416 from the one or more cells 407 when its voltage 417 falls to the discharge voltage limit 412. Optionally, the control circuit 405 can also provide to a user interface of the portable electronic device, i.e., load 410, a low battery indication when the voltage 417 falls to the discharge voltage limit 412. While this sacrifices a small amount of daily capacity, as shown at step 403 and as explained in the discussion of the unexpected results of FIGS. 2 and 3, this increases capacity of the one or more cells 407 across their cycle life. Said differently, these results in a reduction of the variation of the energy storage capacity of the one or more cells 407 across their cycle lives. As described above, step 403 can result in a 25% increase in capacity over 400 hours of discharge or 400 cycles.

One might ask whether a user would desire to reduce the daily capacity of the one or more cells 407 to extend cycle life. After all, an increase 411 in the discharge voltage limit 412 requires a user to charge their battery sooner. However, experimental testing has shown that the trade in daily capacity is minimal when compared to the cycle-life capacity benefit obtained from increasing 411 the discharge voltage limit 412.

Figure 5:
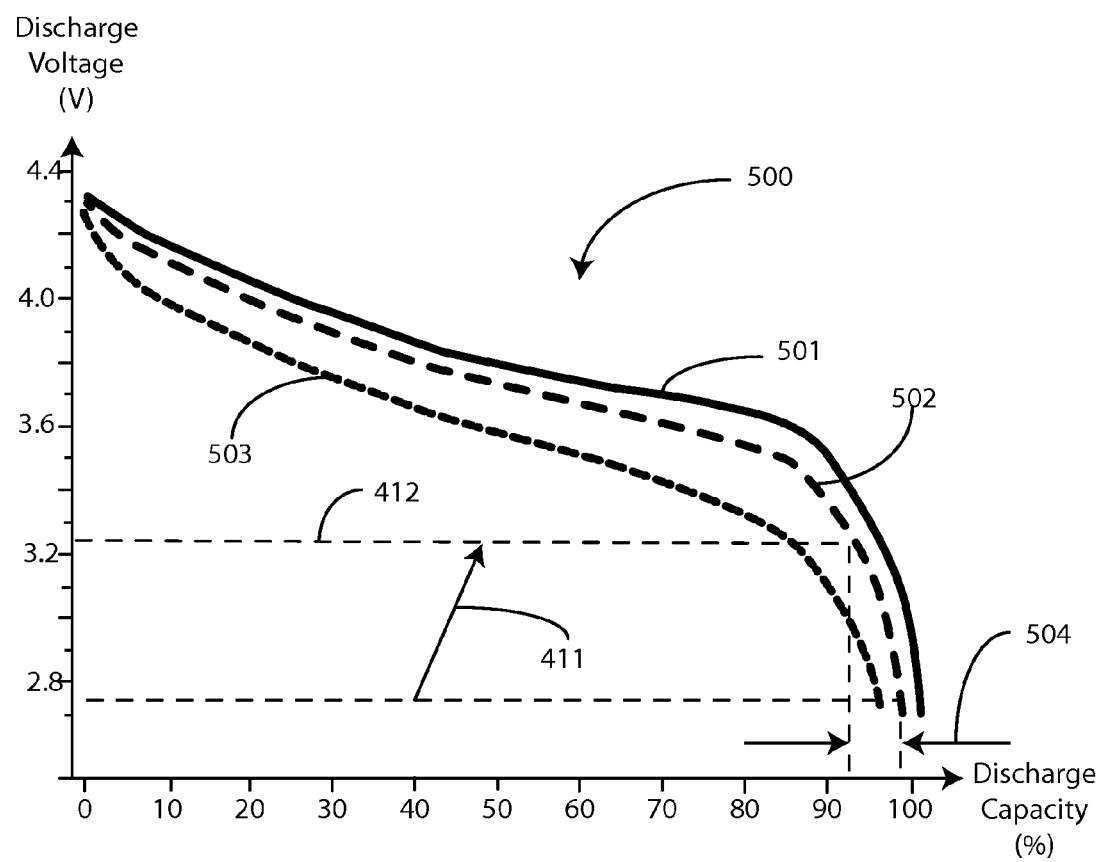
FIG. 5 illustrates tradeoffs between increasing a discharge termination voltage in accordance with one or more embodiments of the invention and capacity.

Turning now to FIG. 5, illustrated therein is a graph 500 of voltage versus capacity for a lithium-ion polymer cell having anodes containing silicon. Curve 501 represents discharge at a 0.2C rate. Curve 502 represents discharge at a 0.5C rate. Curve 503 represents discharge at a 1C rate. Using curve 502 as an example, the graph 500 demonstrates that an increase 411 in the discharge voltage limit 412 of about 400 mV results in a capacity difference 504 of less than 10%. Here, increasing 411 the discharge voltage limit 412 400 mV causes a decrease in only about 7% daily capacity. However, as noted above, cycle life capacity can be increased 25% by giving up only a 7% decrease in daily capacity. Clearly, many users would be more than willing to make this compromise. This is especially true considering that many devices today include embedded batteries that are not user replaceable.

Figure 6:
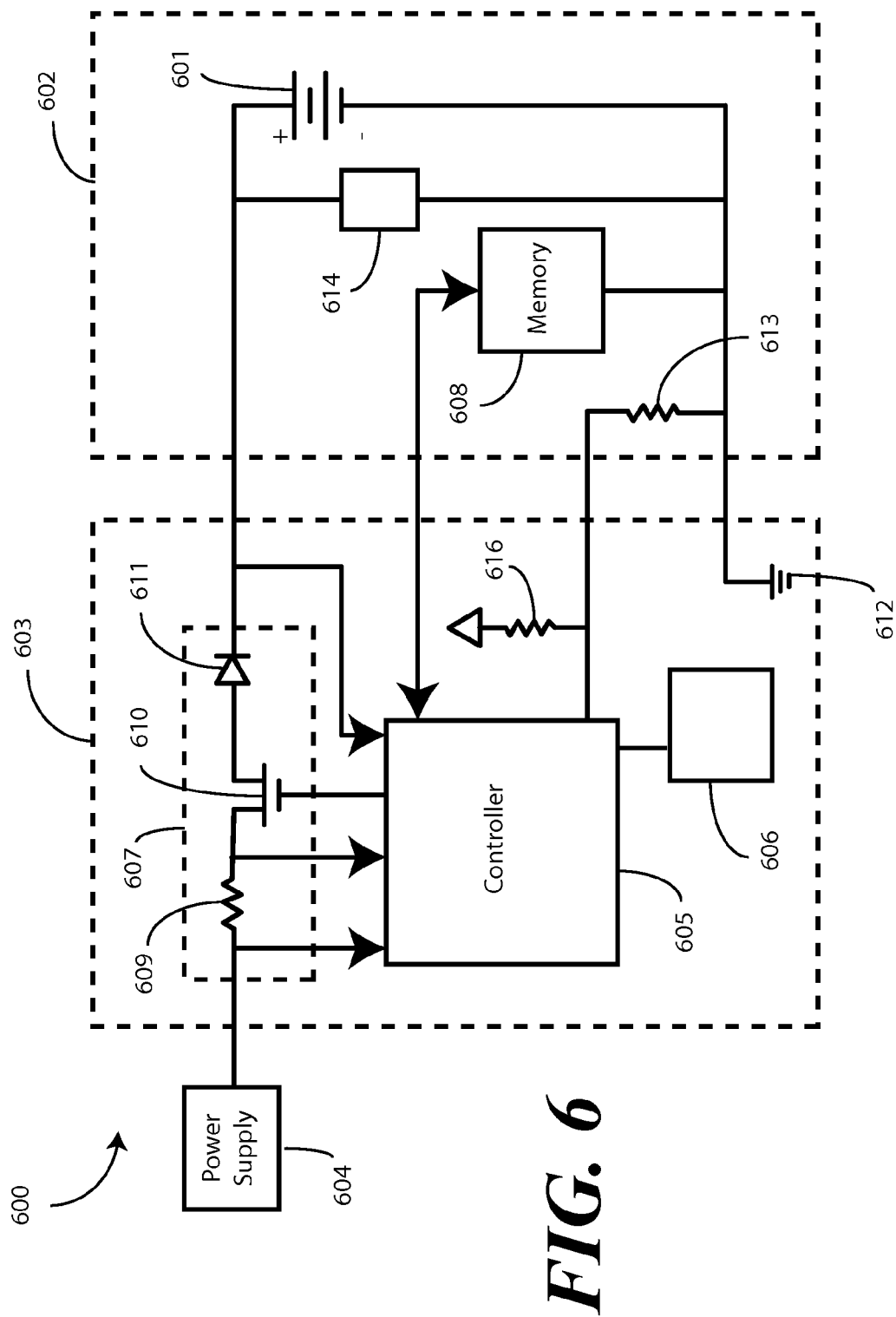
FIG. 6 illustrates one explanatory energy management system configured in accordance with one or more embodiments of the invention.

Turning now to FIG. 6, illustrated therein is one embodiment of a an energy management system 600 configured to reduce variation in the energy storage capacity of one or more cells 601 disposed within a battery 602 in accordance with one or more embodiments of the invention. In the explanatory energy management system 600 of FIG. 6, a charging unit 603 is shown coupled to the battery 602 and a power supply 604. The power supply 604 can provide charging current to the charging unit 603, which can feed the charging current to the battery 602 in accordance with one or more methods described herein. The charging unit 603, as will be explained below, can include a control circuit 605 configured to control the amount of charging current that flows to the battery 602. The control circuit 605 can also be configured to monitor a user discharge profile, and where the user discharge profile meets a predefined criterion, decreasing the discharge energy capacity limit of the battery 602 by increasing a discharge voltage limit of the one or more cells 601.

The explanatory embodiment of FIG. 6 illustrates the battery 602 and charging unit 603 being separate units. As mentioned above, in one or more embodiments the charging unit 603 and the battery 602 may be integrated into a single electronic device. In one or more embodiments, prior to increasing the discharge voltage limit of the one or more cells 601, the charging unit 603 can be configured to confirm with a user whether such an adjustment is permissible. For example, in one embodiment, the control circuit 605 can be configured to prompt, with a user interface 606 operable with the control circuit 605, for authorization to decrease a discharge energy capacity limit of the battery. Where an electronic signal representing authorization from the user is received, the discharge voltage limit can be increased as described above.

One example of a predefined criterion comprises wherein the voltages of the one or more cells 601 remaining above a rated discharge voltage by a predetermined margin, such as twenty-five percent. This maintenance above the rated discharge voltage can be detected, averaged, or integrated across a predetermined usage time, such as three, five, or seven days, or alternatively three, five or seven charge and/or discharge cycles. In another example, the predefined criterion can comprise fully discharging the one or more cells at least once within a predetermined discharge usage time.

While the battery 602 can be any type of battery that is suitable for receiving a charging current and for providing power to an electronic device, in one or more embodiments the battery 602 comprises one or more cells 601 that have anodes comprising silicon. The charging unit 603 can be any device capable of directing and controlling charging current that flows to the battery 602. As an example, the charging unit 603 can be a mobile communications device—such as a cellular telephone, tablet computer, two-way radio, or a personal digital assistant—or a desktop charger that can provide power to a battery for a mobile communications device. Of course, the invention is not limited to these particular examples, as other suitable devices can serve as the charging unit 603 as well.

As shown in FIG. 6, the charging unit 603 can include, for example, a current control circuit 607 that is operable with the control circuit 605. The battery 602 can include, for example, a memory 608. Information can be written to the memory 608, including the rated discharge voltage of the one or more cells 601, the voltages of the one or more cells 601 when charging commences, and how frequently the one or more cells 601 are charged. Where the control circuit 60 increases the discharge voltage limit, this increased limit can be written to the memory 608 as well. In one arrangement, the memory 608 of the battery 602 can be an electrically erasable programmable read only memory, although other suitable types of memory devices can also be used with the battery 602.

The current control circuit 607 of the charging unit 603 can include, for example, a sense resistor 609, a field effect transistor 610 and a diode 611. The control circuit 605 can use, as inputs, connections disposed on either side of the sense resistor 609. The control circuit 605 can also control the operation of the field effect transistor 610 as well. The output of the current control circuit 607 can lead to a B+ contact, which can be coupled to the one or more cells 601 of the battery 602. An input from the B+ contact can also be coupled to the control circuit 605. The negative side of the one or more cells 601 can be coupled to a B− contact, which can be coupled to a ground terminal 612 in the charging unit 603. In addition, data can be transferred between the control circuit 605 and the memory 608 through a data contact. Examples of the type of data that can be exchanged between the control circuit 605 and the memory 608 include rated charging limit, rated discharging limit, increased discharge limit, type of cell, monitored values recorded across a predetermined discharge usage time, profiles of discharge usage, including voltage profiles of the one or more cells 601, predefined usage criteria corresponding to the one or more cells 601, predetermined margins for determining when to increase the discharge voltage limit of the one or more cells 601, predetermined amounts at which to increase the discharge limit of the one or more cells 601, unused capacities of the one or more cells 601 determined from usage profiles, characteristic cell voltages corresponding to capacity, such as those shown in FIG. 3 above, and other information.

In one or more embodiments, the battery 602 can also include a thermistor 613. As is known in the art, the control circuit 605 can monitor cell temperature from the thermistor 613 through a thermistor contact. The charging unit 110 can further include a pull-up resistor 616 to a power supply to enable the control circuit 605 to measure the temperature readings generated by the thermistor 613. Although not shown, the control circuit 605 can include analog-to-digital (A/D) converters and input/outputs (I/O), which, as those of ordinary skill in the art will appreciate, can enable the control circuit 605 to receive and process the information being generated from the components described above.

In operation, when the battery 602 and power supply 604 are coupled to the charging unit 603, charging current can flow from the power supply 604 to the battery 602 through the charging unit 603 to charge the one or more cells 601 from their discharge voltage limit to the rated charging limit. The control circuit 605 can determine whether to increase the discharge voltage limit prior to commencing the charging process by accessing the aforementioned data from the memory 608. The control circuit 605 can monitor the charging current that is being transferred to the battery 602 from the sense resistor 609. The control circuit 605 can monitor the voltage on the battery 602 through the input from the B+ contact. During the charging process, the control circuit 605 can also monitor the temperature of the battery 602 from the thermistor 613. If the temperature rises above a predetermined threshold, the control circuit 605 can adjust the flow of charging current accordingly.

In one embodiment, the control circuit 605 can determine a profile of the voltage of the one or more cells 601 occurring during a predetermined usage time by reading the profile from the memory. The control circuit 605 can then compare this profile to a predetermined criterion to determine whether the discharge voltage limit should be increased.

Where the profile meets the predetermined criterion, the control circuit 605 can increase the discharge voltage limit by writing an increase discharge voltage limit value to the memory 608. The control circuit 605 can then commence charging normally. Charging the battery 602 in accordance with this fashion can help reduce the variation of the capacity of the one or more cells 601 of the battery 602 over its life. That is, the capacity of the battery 602, over the course of its lifetime, may appear to be more consistent because the charge capacity of the battery 602 can be restricted below its maximum capacity during an initial phase due to the increase of the discharge voltage limit.

In one or more embodiments, the battery 602 can optionally include its own independent energy management circuit 614. Where such an energy management circuit is included, many of the functions of the control circuit 605 of the charging unit 603 can be embedded completely within the battery 602. The inclusion of the energy management circuit 614 allows methods of the invention to be executed completely within the battery 602, as opposed to relying upon a charger such as charging unit 603.

Figure 7:
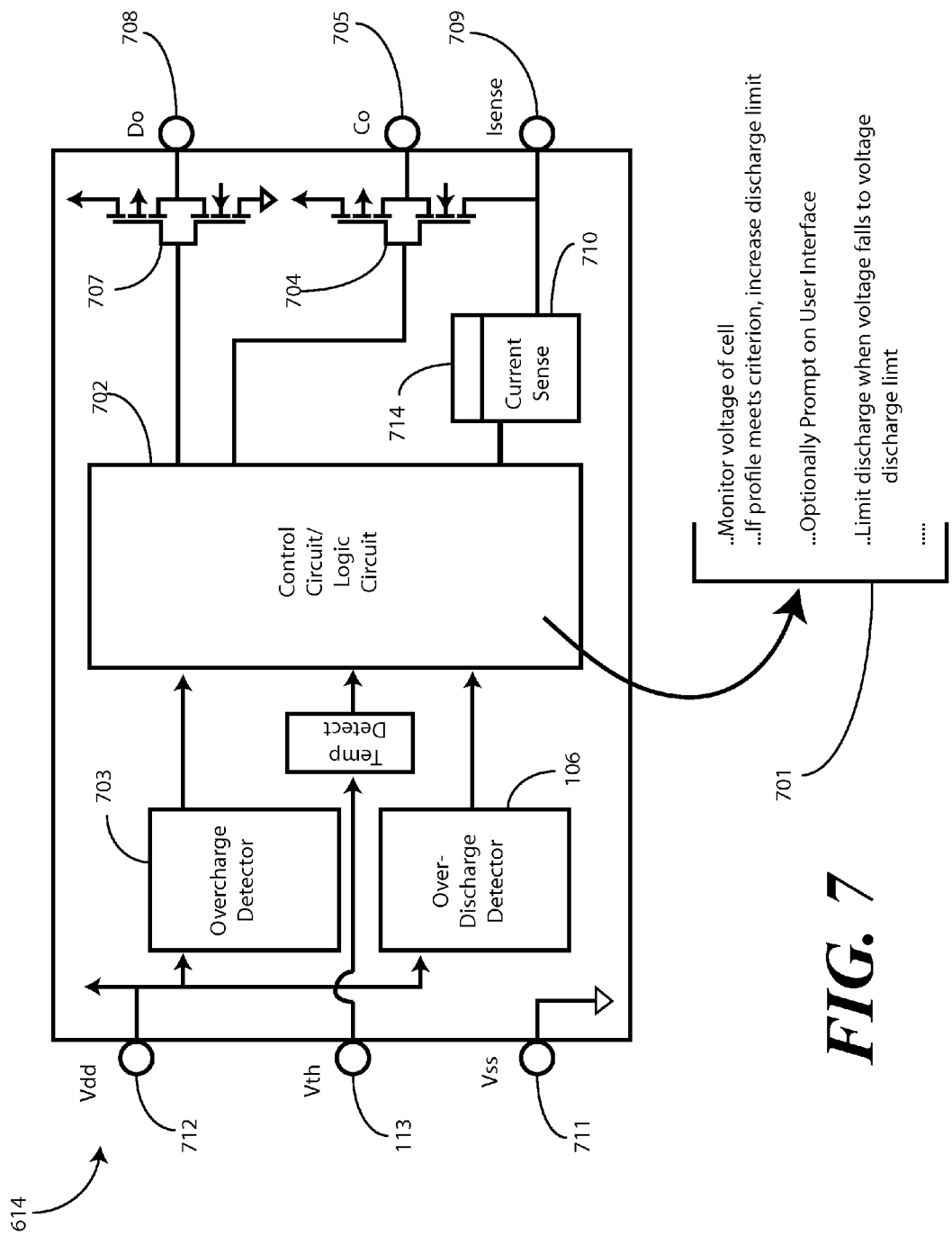
FIG. 7 illustrates one explanatory control circuit suitable for use in a battery and configured in accordance with one or more embodiments of the invention.

Turning now to FIG. 7, illustrated therein is one embodiment of an energy management circuit 614 suitable for inclusion in a battery configured in accordance with one or more embodiments of the invention. The energy management circuit 614 can be used with a battery regardless of whether the battery is detachable from an electronic device or embedded therein.

As shown in FIG. 7, the energy management circuit 614 is shown in schematic block diagram form along with logic instructions 701 that may be implemented by a control circuit 702 residing in the energy management circuit 614 as described herein. The logic instructions 701 can be implemented via embedded code that the control circuit 702 executes. Alternatively, the logic instructions 701 could be implemented in hardware as programmable digital logic, analog logic, digital logic, and so forth.

Prior to discussing the control circuit 702 and the logic instructions 701, some of the other features shown in the illustrative embodiment of FIG. 7 will be described. The illustrative embodiment of FIG. 7 shows the energy management circuit 614 configured both to manage energy capacity of the rechargeable cells with which it is used, and also to serve as a "safety circuit." As used herein, a "safety circuit" is any circuit capable of monitoring the voltage across at least one rechargeable cell. As is known in the art, some rechargeable batteries, such as lithium ion and lithium polymer batteries, are generally coupled with protection components to ensure that they are not overcharged. Overcharging of such batteries can compromise reliability. While the illustrative embodiment of FIG. 7 includes both safety features and energy management functions, it will be clear to those of ordinary skill in the art having the benefit of this disclosure that the invention is not so limited. The energy management circuit 614 can be implemented as a stand-alone device without safety functions. Further, while shown in FIG. 7 as an integrated circuit, embodiments of the present invention can be implemented as discrete circuits, application specific circuits, and as combinations of integrated circuits.

The illustrative energy management circuit 614 of FIG. 7 includes an overcharge detector 703. The overcharge detector 703 is configured to monitor a voltage across the rechargeable cell to which it is coupled through a Vdd node 712 and a Vss node 711. The Vdd node 712 and a Vss node 711 monitor the voltage at the cathode and at the anode of cell coupled to the energy management circuit 614, respectively. For discussion purposes, embodiments of the invention will be described with the energy management circuit 614 being coupled to a single rechargeable cell, such as a single, lithium polymer cell having a silicon-based anode. However, it will be obvious to those of ordinary skill in the art having the benefit of this disclosure that the invention is not so limited. The energy management circuit 614 could be used with multiple cells, coupled in series or parallel.

The overcharge detector 703 compares this sensed voltage to a predetermined maximum cell voltage threshold. When the cell voltage exceeds this threshold, the overcharge detector 703, which may work with the control circuit 702, causes a push-pull output stage 704 to apply a control signal to the charge control node 705. When the charge control node 705 is coupled to a switch, such as a metal oxide on silicon field effect transistor or bipolar junction transistor, the switch opens so as to prevent any further charging of the cell.

Similarly, the energy management circuit 614 can include an overdischarge detector 706 that ensures the voltage across the cell does not fall below a predetermined undervoltage threshold, which in one embodiment is the increased discharge voltage limit. If it does, the overdischarge detector 706 causes an output stage 707 to apply a control signal to a discharge control node 708. When the discharge control node 708 is coupled to a discharge disconnect switch coupled in series with the cell, application of the control signal at the discharge control node 708 can open the discharge disconnect switch or otherwise increase a serial impedance of a discharge current limiter, thereby reducing or preventing any further discharge of the cell.

In the illustrative embodiment of FIG. 7, current flowing through the cell or cells is monitored by way of a current sense node 709. The current sense node 709 is coupled to a current sensing circuit 710. In one embodiment, the current sensing circuit 710 may work with a delay circuit 714. The delay circuit 714, where used, can provide hysteresis and transient immunity for the current sense node 709.

In one mode, the current sense node 709, working with the current sensing circuit 710, senses the voltage between the Vss node 711 and the current sense node 709. When this sensed voltage exceeds a predetermined threshold, the control circuit 702 causes a control signal to be applied to the discharge control node 708. This control signal opens the discharge disconnect switch or otherwise increases a serial impedance of a discharge current limiter, thereby stopping the flow of current in the discharge direction.

Other optional components of the energy management circuit 614 include a temperature-sensing node 713. The temperature-sensing node 713 may be coupled to a thermistor or other temperature-sensing device to monitor the temperature of the rechargeable cell. This may be the case, for example, where an application requires that charging of the cell only occur between the temperatures of 0 and 45 degrees centigrade.

In one embodiment of the invention, the control circuit 702 is operable with the Vdd node 712 and a Vss node 711 to monitor the voltage at the cathode and at the anode of cell coupled to the energy management circuit 614, respectively. In doing so, the control circuit 702 monitors the voltage of the attached cell for a predetermined discharge usage time. Where a profile of the voltage during the predetermined discharge usage time meets a predefined usage criterion, the control circuit 702 can increase a discharge voltage limit at which the overdischarge detector 706 operates. For example, in one embodiment the control circuit 702 can monitor the cell voltage to determine whether the voltage remains above a rated discharge voltage of the cell for the predetermined usage time by at least a predetermined margin. One example of the predetermined margin is about 25%. Where this is the case, the control circuit 702 can increase the discharge voltage limit by a predetermined amount, one example of which is about 400 mA. Illustrating by example, this may cause a discharge voltage limit to increase from about 2.7 volts to 3.1 volts or more.

Once the battery is charged, the control circuit 702 can again monitor the cell voltage with the Vdd node 712 and the Vss node 711. When the voltage falls to the increased discharge voltage limit, in one embodiment the control circuit 702 can deliver a low battery signal via an optional data port 715 to an attached electronic device such that a user interface of the portable electronic device can present a low battery indication to a user. Also, when the voltage of the cell falls to the increase discharge voltage limit, the control circuit 702 can deliver a control signal to the output stage 707 to apply a control signal to a discharge control node 708, thereby causing a series impedance of a discharge control device coupled to the discharge control node 708 to increase its impedance, thus curtailing discharge of the cell to an attached load.

In one or more embodiments, the control circuit 702 can have stored therein a correlation of capacity and cell voltage, one example of which is shown above in FIG. 3. When this information is stored in the control circuit 702 or a corresponding memory device, the control circuit 702 can be configured to determine an unused capacity from the detected profile by referencing a corresponding capacity from the correlation. A predetermined "bottom" characteristic cell voltage can be extrapolated from the correlation as well. Thus, when increasing the discharge voltage limit, the control circuit 702 can make the increase commiserate with the unused capacity left by the user. This unused capacity can be the result of a multi-cycle or multi-day integration as well. To avoid "over increasing" the discharge voltage limit, the control circuit 702 in one or more embodiments can the increase the discharge voltage limit to a level above a rated discharge voltage and below the characteristic cell voltage.

Figure 8:
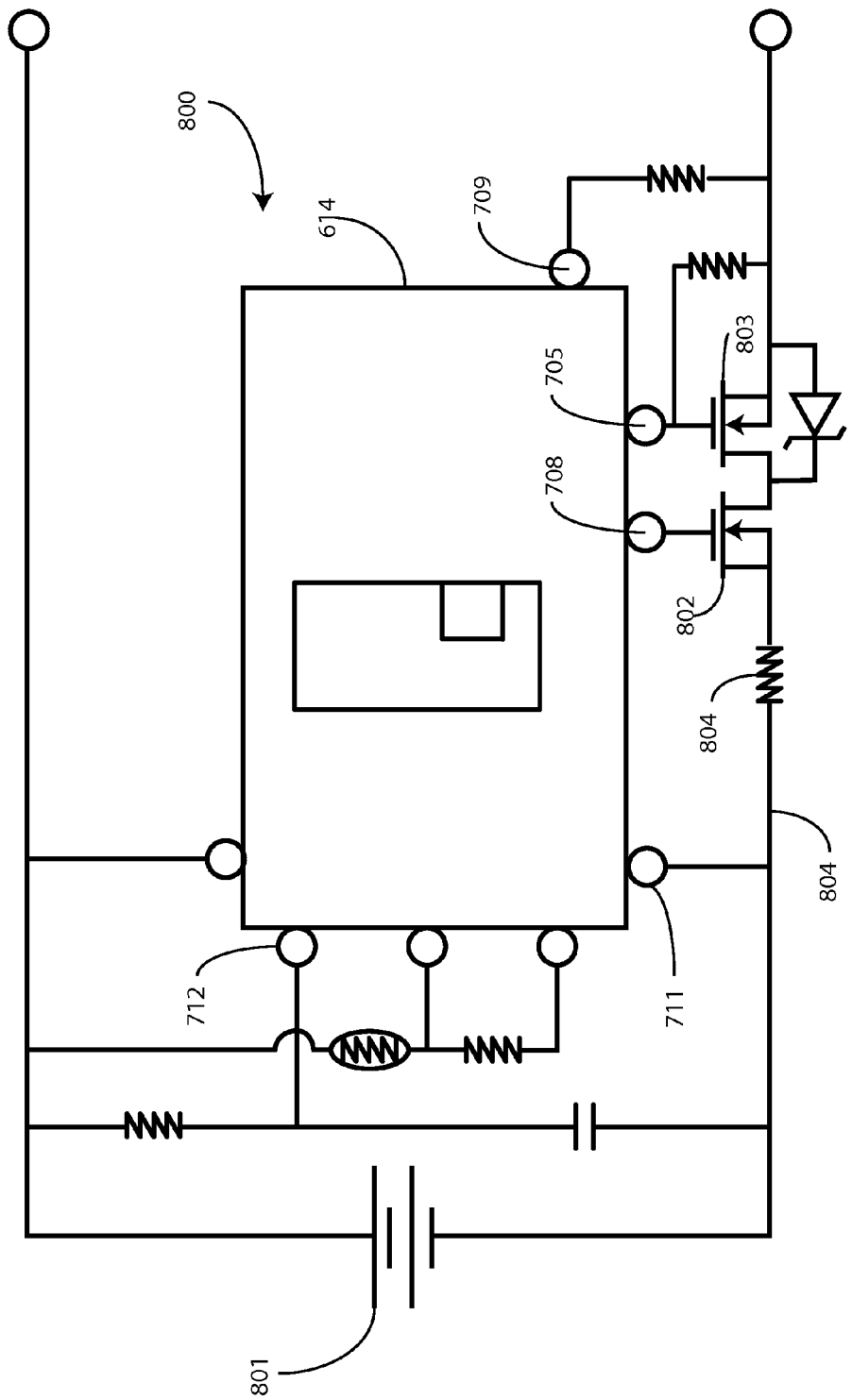
FIG. 8 illustrates one explanatory battery configured in accordance with one or more embodiments of the invention.

Turning now to FIG. 8, illustrated therein is one embodiment of a rechargeable battery 800 using an energy management circuit 614 configured in accordance with one or more embodiments of the invention. The energy management circuit 614 is coupled to one or more rechargeable cells. In the illustrative embodiment of FIG. 8, the one or more rechargeable cells are shown as cell 801. The Vdd node 712 is coupled through a current limiting resistor to the cathode of the cell 801, while the Vss node 711 is coupled to the anode of the cell 801. In this explanatory embodiment, the anode is approximately 90% graphite and approximately 8% silicon.

In the illustrative embodiment of FIG. 8, the discharge control node 708 is coupled to a discharge disconnect switch 802, which functions as the discharge control device or discharge current limiter for the battery 800. The charge control node 705 is coupled to the charge disconnect switch 803. The discharge disconnect switch 802 and charge disconnect switch 803 are in turn coupled serially with the cell 801, and are used to prevent discharge current and charging current flowing from/to the cell 801, respectively. In the illustrative embodiment of FIG. 8, the discharge disconnect switch 802 and charge disconnect switch 803 are metal oxide silicon field effect semiconductors (MOSFETs), although other devices, including switches, relays, circuit breakers and controllable fuses may be substituted, depending upon the application. MOSFETs are frequently used in battery applications due to their low serial impedance when operating in the fully on, or saturation mode.

Where MOSFETs are employed as disconnect switches, they are generally capable of prohibiting current flow in only one direction. This is the reason that two transistors are used—one to block charging current and one to block discharging current. Two transistors are required because each MOSFET has a corresponding parasitic body diode that is inherent due to its physical structure. Consequently, each MOSFET can only prevent current from flowing in a single direction. However, these body diodes are useful in accordance with embodiments of the present invention in that discharge current can be prohibited, yet charge current permitted. The body diodes of the discharge disconnect switch 802 and the charge disconnect switch 803 allow the current to flow in the other direction. To stop all current flow, therefore, both MOSFETs must be turned off. Thus the use of a charge control node 705 in addition to a discharge control node 708. When the discharge disconnect switch 802 is open, charging current may still flow through the parasitic diode of the discharge disconnect switch 802, but no discharge current flows.

The current sense node 709 is coupled to the low side 804 of the circuit, such that the current sense node 709 may work in conjunction with the Vss node 711 to sense the voltage across the discharge disconnect switch 802, the charge disconnect switch 803, an optional current sense resistor 805, or combinations thereof. When this voltage becomes too high, an optional overcurrent prevention circuit of the control circuit 702 detects that the current being drawn from the cell 801 is correspondingly too high. When this occurs, the control circuit 702 applies a control signal to the discharge control node 708, thereby causing the discharge disconnect switch 802 to open. The control circuit 702 then periodically momentarily closes the discharge disconnect switch 802 to determine whether the current is still too high. When sensing that it is not, the control circuit 702 leaves the discharge disconnect switch 802 closed.

When the voltage of the cell 801 falls to the discharge voltage limit, the control circuit 702 applies a signal to the discharge control node 708 to cause the impedance of the discharge disconnect switch 802, which is coupled serially between the cell 801 and a load coupled to terminals 806,807, to increase. This discontinues cell discharging due to the discharge voltage limit being reached.

Figure 9:
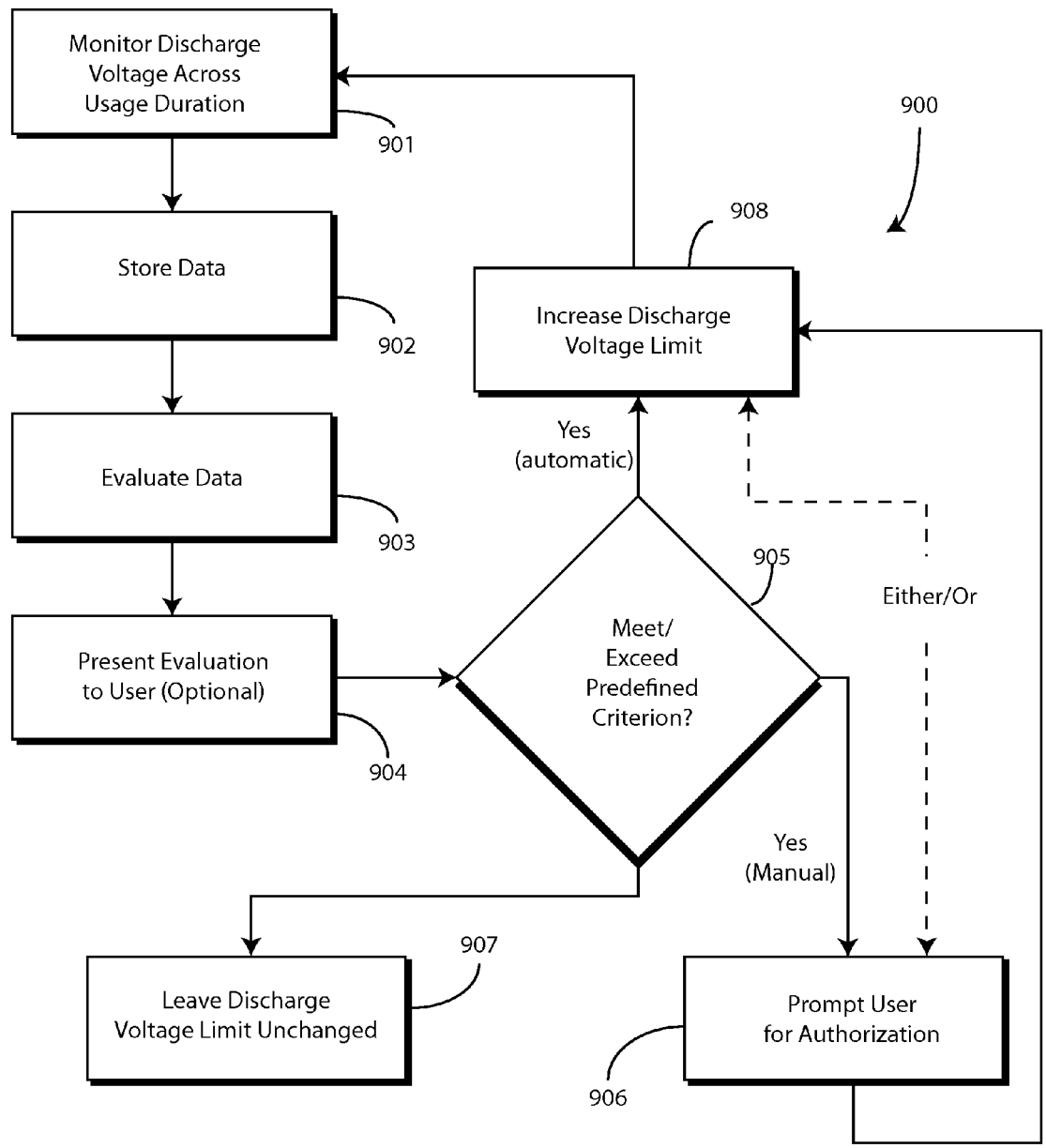
FIG. 9 illustrates one explanatory method for reducing variations in charge capacity for cells in a battery across their cycle life configured in accordance with one or more embodiments of the invention.

Turning now to FIG. 9, illustrated therein is a method 900 for reducing variation of an energy storage capacity of a battery across its cycle life configured in accordance with one or more embodiments of the invention. At step 901a voltage sensor monitors one or more voltages of one or more cells of a battery for a predetermined usage time. For example, this step 901 can include determining whether a user fully discharges a cell to 2.7 volts or only partially discharges the cell, such as to 3.6 volts, which represents an 80% capacity discharge based upon rated capacities of a new cell. Step 901 can be repeated across a predetermined discharge time, which may span several charge cycles or days. At step 902, the monitored data can be stored as a voltage profile in a memory of a battery pack or electronic device.

At step 903, the stored profiles can be evaluated. In one embodiment, step 903 comprises the creation of a profile based upon the voltages monitored at step 902 over time. Optional step 904 permits notifying a user regarding the analysis and evaluation that occurred at step 903.

Figure 10:
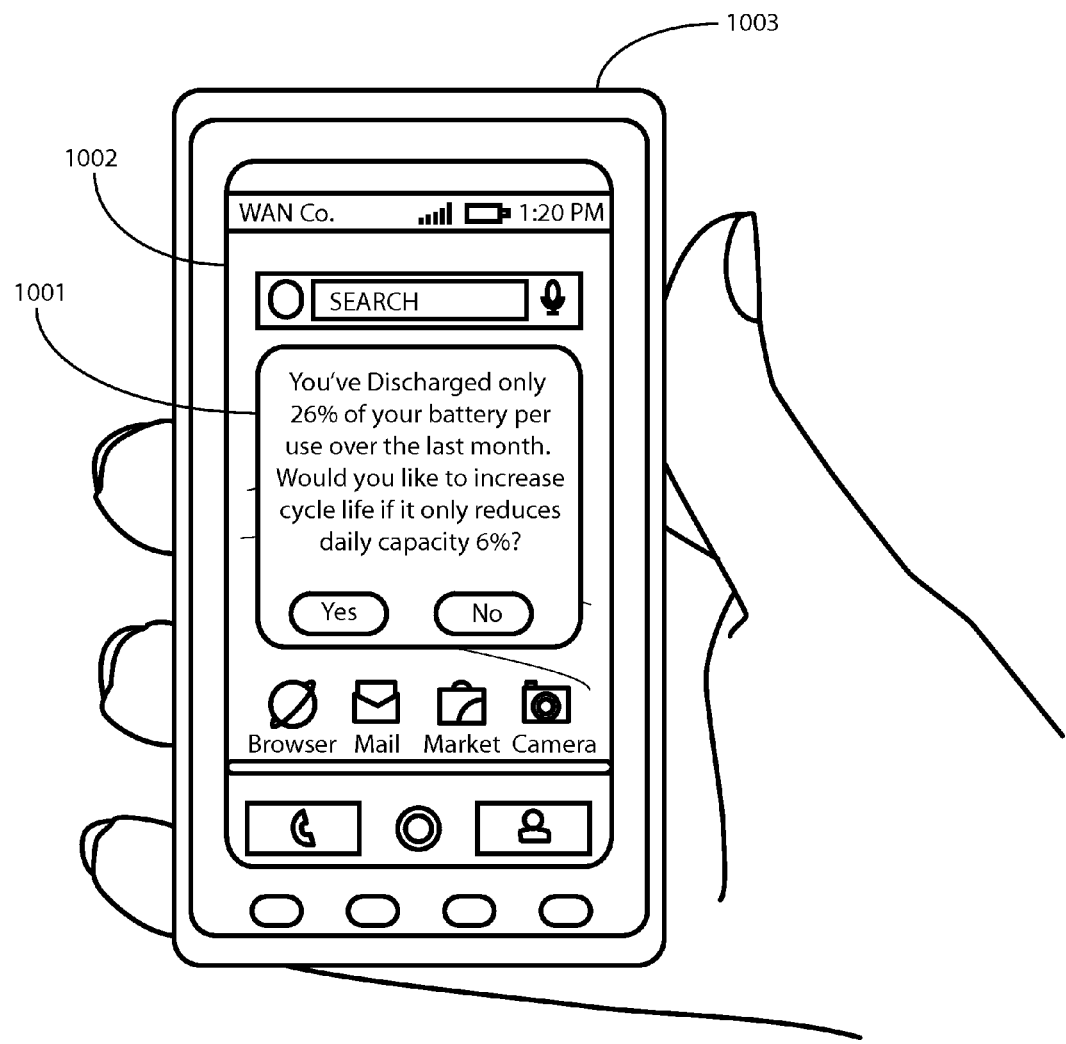
FIG. 10 illustrates one example of a portable electronic device operable with a control circuit and one or more cells configured in accordance with one or more embodiments of the invention presenting a prompt asking for authorization to alter a discharge termination point.

Decision 905 comprises comparing the profile to a predetermined usage criterion. Several examples of usage criteria have been given above. However it will be clear to those of ordinary skill in the art having the benefit of this disclosure that the criterion to which the profile is compared at decision 905 can vary based upon application.

Where the predefined criterion is met, in one embodiment, optional step 906 comprises delivering a prompt to an electronic device requesting user permission to increase a discharge voltage limit of the cells based upon decision 905. Step 906 can also include the provision of a prompt comprising indicia of an estimated capacity compromise that will result when the discharge voltage limit is increased. Turning briefly to FIG. 10, an explanatory prompt 1001 is being presented on the display 1002 of an electronic device 1003.

Turning back to FIG. 9, where the optional step 906 is included, this step 906 can also comprise receiving a user response from the electronic device (1003) in response to the prompt (1001). Where the response comprises an authorization, step 907 can include increasing the discharge voltage limit of the cells. Where optional step 906 is not included, step 907 can occur automatically. If the predefined criterion is not met at decision 905, or if the user disapproves the increase, the discharge voltage can be left unadjusted at step 908.

Figure 11:
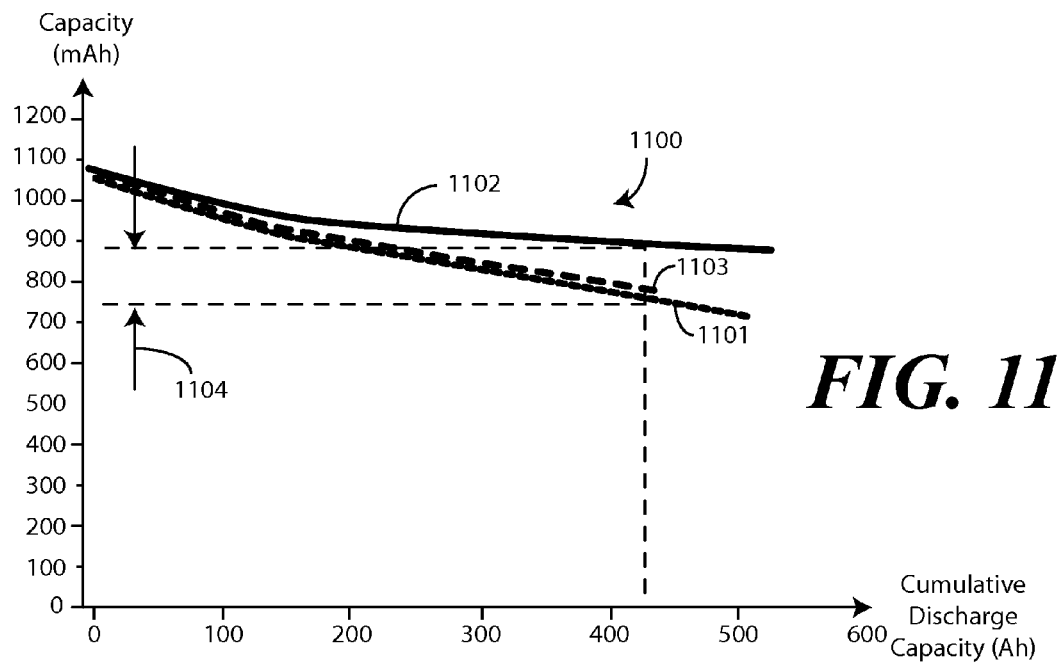
FIGS. 11-12 illustrate additional test results demonstrating reductions in cell capacity variation when using embodiments of the invention.
Figure 12:
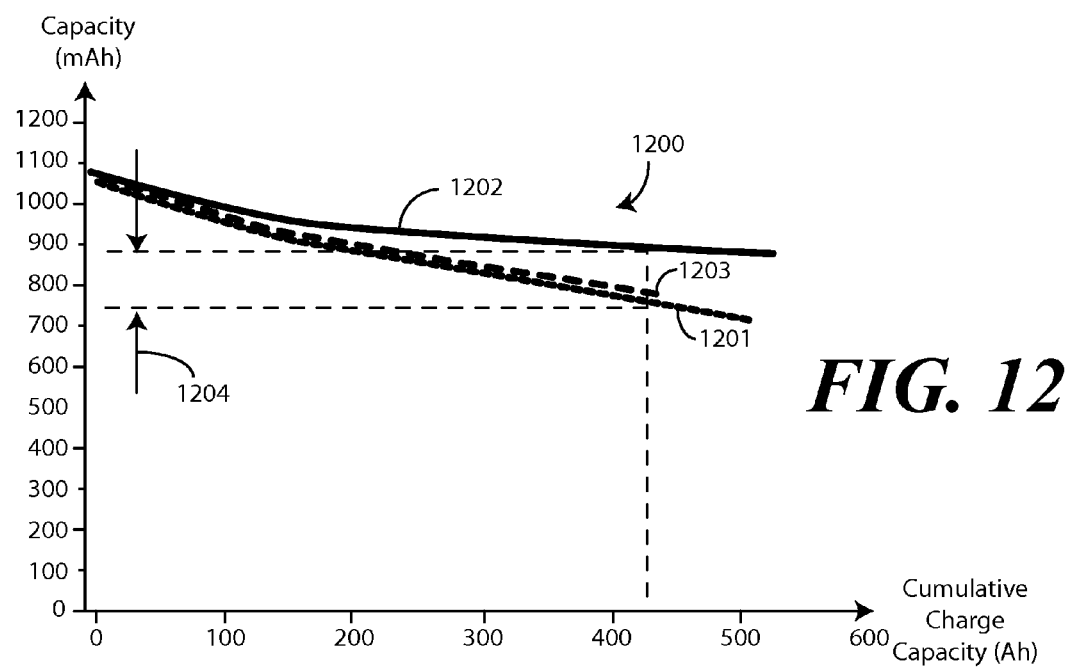

FIGS. 11-12 illustrate additional test results demonstrating reductions in cell capacity variation when using embodiments of the invention. Turning first to FIG. 11, discharge capacity is plotted against cumulative discharge capacity. Specifically, in chart 1100, curves 1101,1102,1103 plot discharge capacity along the vertical axis against cumulative discharge energy along the horizontal axis.

Chart 1100 illustrates a first curve 1101 representing the full discharge test, a second curve 1102 representing the upper-voltage range test, and a third curve 1103 representing the lower-voltage range test. As with the graph (200) of FIG. 2, three things become clear from the experimental testing: First, there is clearly capacity fade in the test cells having silicon-based anodes over their operable life, which is represented here as cumulative discharge capacity. Examining curve 1101, it is clear that while the cells (101) started with a capacity of nearly 1100 mAh, after 400 Amp-hours of discharge at roughly 1.07 A, capacity was only 800 mAh. This represents over a 25% loss in capacity across a 400 Amp-hours of cumulative discharging.

Second, when the cells (101) were exposed to the lower-voltage range test, they experienced almost the identical amount of capacity loss. Specifically, after 400 Amp-hours of cumulative discharge, the cells exposed to the lower-voltage range test lost 25% of their capacity as well. However, when the cells (101) were exposed to the upper-voltage range test, they experienced an improvement 1104 of nearly 100 mAh in capacity retention across the same range. This represents a 50% improvement over the cells (101) that were fully discharged or were cycled in the lower end of their rated voltage range.

Turning now to FIG. 12, charge capacity is plotted against cumulative charge capacity. Chart 1200 illustrates a first curve 1201 representing the full discharge test, a second curve 1202 representing the upper-voltage range test, and a third curve 1203 representing the lower-voltage range test. As with the preceding figures, three things become clear from the experimental testing: First, there is clearly capacity fade in the test cells having silicon-based anodes over their operable life, which is represented here as cumulative charge capacity. Examining curve 1201, it is clear that while the cells (101) started with a capacity of nearly 1100 mAh, after 400 Amp-hours of discharge at roughly 1.07 A, capacity was only 800 mAh. This represents over a 25% loss in capacity across a 400 Amp-hours of cumulative charging.

Second, when the cells (101) were exposed to the lower-voltage range test, they experienced almost the identical amount of capacity loss. Specifically, after 400 Amp-hours of cumulative charge, the cells exposed to the lower-voltage range test lost 25% of their capacity as well. However, when the cells (101) were exposed to the upper-voltage range test, they experienced an improvement 1204 of nearly 100 mAh in capacity retention across the same range. This represents a 50% improvement over the cells (101) that were fully discharged or were cycled in the lower end of their rated voltage range.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of managing life cycle capacity of a battery, comprising:
monitoring, with a voltage sensor, one or more voltages of one or more cells of the battery for a plurality of discharge cycles;
determining a plurality of profiles based on the one or more voltages monitored during the plurality of discharge cycles, wherein the plurality of profiles represents a user discharge history of the battery over the plurality of discharge cycles;
determining a minimum unused capacity of the one or more cells by referencing the determined plurality of profiles against a correlation of cell capacity and cell voltage;
determining a characteristic cell voltage exhibited by the one or more cells at the minimum unused capacity of the one or more cells;
in response to determining that the plurality of profiles meets a predefined usage criterion, determining, based on the plurality of profiles, a proposed discharge voltage limit, wherein the proposed discharge voltage limit is above a rated discharge voltage of the one or more cells and below the determined characteristic cell voltage;
determining, based on the plurality of profiles, a predicted amount of daily runtime capacity loss and a predicted amount of life cycle capacity gain for the proposed discharge voltage limit;
indicating, via a user interface, the predicted amount of daily runtime capacity loss and the predicted amount of life cycle capacity gain for the proposed discharge voltage limit;
prompting, via the user interface, for authorization to increase a discharge voltage limit of the one or more cells from the rated discharge voltage limit of the one or more cells of the battery to the proposed discharge voltage limit;

receiving an electronic signal indicating authorization to increase the discharge voltage limit to the proposed discharge voltage limit;

in response to receiving the electronic signal, increasing the discharge voltage limit of the one or more cells to the proposed discharge voltage limit; and operating the one or more cells in accordance with the increased discharge voltage limit by limiting a discharge current from the one or more cells when the one or more voltages fall to the proposed discharge voltage limit.

2. The method of claim 1, further comprising providing, on the user interface, a low battery indication when the one or more voltages fall to the discharge voltage limit.

3. The method of claim 1, wherein the limiting comprises increasing a series impedance of a discharge control device coupled serially between the battery and a load.

4. The method of claim 1, wherein the increasing comprises increasing the discharge voltage limit by at least 400 mV.

5. The method of claim 1, wherein the increasing comprises increasing the discharge voltage limit from about 2.7 volts to at least 3.1 volts.

6. The method of claim 1, wherein the plurality of discharge cycles comprise five or more charging cycles.

7. The method of claim 1, wherein the anodes of the one or more cells of the battery comprise silicon and a silicon alloying carbon.

8. The method of claim 1, wherein the life cycle capacity gain comprises a reduction of degradation of a charge capacity of the one or more cells of the battery across a cycle life of the one or more cells of the battery.

9. The method of claim 1, further comprising:
determining that the plurality of profiles meets the predefined usage criterion, wherein the predefined usage criterion comprises the one or more voltages remaining above a rated discharge voltage of the one or more cells by a predetermined margin for a predetermined number of discharge cycles.

10. The method of claim 9, wherein the predetermined margin is about twenty-five percent.

11. The method of claim 1, wherein the user interface is a user interface of a portable electronic device operable with the battery.

12. An energy management circuit comprising:
a control circuit, operable with:
a voltage sense node configured to sense a voltage across one or more rechargeable cells; and
a discharge control node configured to control a discharge current limiter coupled serially with the one or more rechargeable cells;
wherein the control circuit is configured to:
determine a plurality of profiles of the voltage at the voltage sense node over a predetermined number of days, wherein the plurality of profiles represents a user discharge history of the one or more rechargeable cells over the predetermined number of days;
determine a minimum unused capacity of the one or more rechargeable cells by referencing the determined plurality of profiles against a correlation of cell capacity and cell voltage;
determine a characteristic cell voltage exhibited by the one or more rechargeable cells at the minimum unused capacity of the one or more rechargeable cells;
in response to determining that the plurality of profiles of the voltage meets a predefined criterion, determine, based on the plurality profiles of the voltage, a proposed discharge voltage limit, wherein the proposed discharge voltage limit is above a rated discharge voltage of the one or more rechargeable cells and below the determined characteristic cell voltage;
determine, based on the plurality of profiles of the voltage, a predicted amount of daily runtime capacity loss and a predicted amount of life cycle capacity gain for the proposed discharge voltage limit;
indicate, with a user interface of an electronic device coupled to the control circuit, the predicted amount of daily runtime capacity loss and the predicted amount of life cycle capacity gain for the proposed discharge voltage limit;
deliver a prompt to the user interface of the electronic device requesting user permission to increase a discharge voltage limit of the one or more rechargeable cells to the proposed discharge voltage limit;
receive a user response from the electronic device in response to the prompt;
when the user response comprises an authorization to increase the discharge voltage limit of the one or more rechargeable cells to the proposed discharge voltage limit, increase the discharge voltage limit for the one or more rechargeable cells to the proposed discharge voltage limit; and
operate the one or more rechargeable cells in accordance with the increased discharge voltage limit by causing the discharge current limiter to limit a discharge current from the one or more rechargeable cells upon the voltage at the voltage sense node falling to the proposed discharge voltage limit.

13. The energy management circuit of claim 12, wherein causing the discharge current limiter to limit the discharge current comprises:
the control circuit applying a control signal to the discharge control node upon the voltage at the voltage sense node falling to the proposed discharge voltage limit, wherein the control signal is configured to increase a serial impedance of the discharge current limiter.

14. The energy management circuit of claim 12, wherein anodes of the one or more rechargeable cells comprise silicon and a silicon alloying carbon.

15. The energy management circuit of claim 12, wherein the one or more rechargeable cells and the control circuit are both disposed within a battery pack.

16. The energy management circuit of claim 12, wherein the control circuit is configured to determine that the plurality of profiles of the voltage meets the predefined criterion, wherein the predefined criterion comprises the plurality of profiles of the voltage remaining above a rated discharge voltage of the one or more rechargeable cells by a predetermined margin for the predetermined number of days.

17. A method of managing life cycle capacity of a battery, comprising:
monitoring, with a control circuit coupled to one or more cells of the battery, a discharge rate of one or more cells of the battery across a plurality of discharge cycles;

determining a plurality of user discharge profiles based on the monitored discharge rate of the one or more cells of the battery, wherein the plurality of user discharge profiles represents a user discharge history of the one or more cells over the plurality of discharge cycles;

determining a characteristic cell voltage exhibited by the one or more cells at a minimum unused capacity of the one or more cells across the plurality of discharge cycles;

when the plurality of user discharge profiles meets a predefined criterion, determining, based on the determined plurality of user discharge profiles, a proposed discharge voltage limit, wherein the proposed discharge voltage limit is above a rated discharge voltage of the one or more cells and below the determined characteristic cell voltage;

determining, based on the plurality of user discharge profiles, a predicted amount of daily runtime capacity loss and a predicted amount of life cycle capacity gain for the proposed discharge voltage limit;

indicating, with a user interface operable with the control circuit, the predicted amount of daily runtime capacity loss and the predicted amount of life cycle capacity gain for the proposed discharge voltage limit;

prompting, with the user interface operable with the control circuit, for authorization to increase a discharge voltage limit from the rated discharge voltage limit of the one or more cells to the proposed discharge voltage limit;

receiving an authorization to increase the discharge voltage limit to the proposed discharge voltage limit;

in response to receiving the authorization, increasing the discharge voltage limit of the one or more cells to the proposed discharge voltage limit; and operating the one or more cells in accordance with the increased discharge voltage limit by limiting a discharge current from the one or more cells when one or more voltages of the one or more cells fall to the proposed discharge voltage limit.

18. The method of claim 17, further comprising:

monitoring, with the control circuit coupled to the one or more cells of the battery, the one or more voltages of the one or more cells of the battery across the plurality of discharge cycles, wherein the predefined criterion comprises the one or more voltages remaining above the rated discharge voltage of the one or more cells by a predetermined margin for a predetermined number of discharge cycles.

19. The method of claim 17, wherein the anodes of the one or more cells of the battery comprise silicon and a silicon alloying carbon.

20. The method of claim 17, wherein limiting the discharge current from the one or more cells comprises increasing a series impedance of a discharge control device coupled serially between the battery and a load.

\* \* \* \* \*